(12) United States Patent
Das et al.

(10) Patent No.: US 8,688,997 B2
(45) Date of Patent: *Apr. 1, 2014

(54) USING DIGITAL CERTIFICATES IN DOCUMENT DISTRIBUTION

(75) Inventors: Sujata Das, Saratoga, CA (US); Sunil C. Agrawal, Santa Clara, CA (US); Charles R. Myers, IV, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/229,463

(22) Filed: Sep. 9, 2011

(65) Prior Publication Data

US 2013/0124869 A1    May 16, 2013

Related U.S. Application Data

(63) Continuation of application No. 12/507,384, filed on Jul. 22, 2009, now Pat. No. 8,024,561, which is a continuation of application No. 11/111,088, filed on Apr. 20, 2005, now Pat. No. 7,581,106.

(51) Int. Cl.
*H04L 9/32* (2006.01)

(52) U.S. Cl.
USPC .......................................................... 713/176

(58) Field of Classification Search
USPC .......................................................... 713/176
See application file for complete search history.

(56) References Cited

U.S. PATENT DOCUMENTS

| | | | |
|---|---|---|---|
| 6,021,202 A * | 2/2000 | Anderson et al. | 705/54 |
| 6,324,645 B1 | 11/2001 | Andrews et al. | |
| 6,330,672 B1 | 12/2001 | Shur | |
| 6,510,513 B1 * | 1/2003 | Danieli | 713/156 |
| 2003/0130952 A1 * | 7/2003 | Bell et al. | 705/51 |
| 2003/0159035 A1 | 8/2003 | Orthlieb et al. | |
| 2003/0163685 A1 | 8/2003 | Paatero | |
| 2003/0220880 A1 * | 11/2003 | Lao et al. | 705/51 |
| 2006/0112432 A1 * | 5/2006 | Daos et al. | 726/26 |

FOREIGN PATENT DOCUMENTS

CA          2775814         9/2013

OTHER PUBLICATIONS

"Non-Final Office Action", U.S. Appl. No. 11/111,088, (Oct. 9, 2008), 7 pages.
"Non-Final Office Action", U.S. Appl. No. 12/507,384, (Jan. 26, 2011), 15 pages.
"Notice of Allowance", U.S. Appl. No. 11/111,088, (Apr. 16, 2009), 6 pages.
"Notice of Allowance", U.S. Appl. No. 12/507,384, (May 13, 2011), 9 pages.

* cited by examiner

*Primary Examiner* — William Powers
(74) *Attorney, Agent, or Firm* — Wolfe-SBMC

(57) ABSTRACT

One embodiment of the present invention provides a system that uses digital certificates to facilitate enforcing licensing terms for applications that manipulate documents. During operation, the system obtains a credential, wherein the credential includes a private key and a digital certificate containing a corresponding public key. This digital certificate also contains a profile specifying allowed operations which can be performed on documents signed with the credential. Next, the system digitally signs a document using the credential, so that the resulting signed document is signed with the private key and includes a copy of the digital certificate with the profile specifying the allowed operations. The certificate issuer can subsequently revoke the digital certificate (which effectively revokes the license) if teens of a license agreement associated with the digital certificate are violated.

20 Claims, 3 Drawing Sheets

USING DIGITAL CERTIFICATES IN DOCUMENT DISTRIBUTION

This application is a continuation of U.S. application Ser. No. 12/507,384, filed Jul. 22, 2009 now U.S. Pat. No. 8,024,561, which is a continuation of U.S. application Ser. No. 11/111,088, filed on Apr. 20, 2005 now U.S. Pat. No. 7,581,106, both of which are incorporated by reference herein in their entirety.

BACKGROUND

1. Field of the Invention

The present invention relates to techniques to facilitate licensing for software products. More specifically, the present invention relates to a method and an apparatus that uses digital certificates to facilitate enforcement of licensing terms for a software product after the software product is delivered.

2. Related Art

A software product is often distributed to customers in a number of possible configurations, which provide differing levels of functionality. The specific configuration which is shipped to a customer is generally determined by the specific requirements of the customer, and the amount that the customer is willing to pay for an associated software license. Different product configurations are typically associated with different stock-keeping units (SKUs), wherein SKUs are unique numeric identifiers which identify specific product configurations.

Conventionally, different product SKUs of a product line are generated by: (1) producing different packagings of the code (for example, by removing code related to unsupported features), or (2) through product license keys, which are commonly entered by a user to enable a program to operate.

Producing different packagings of the code is a cumbersome process, which can greatly complicate the task of distributing software. Furthermore, in either of the above-described approaches, if a customer violates the terms of the licensing agreement, there is no easy way to stop the customer from using the software product.

Hence, what is needed is a method and an apparatus that facilitates distributing different configurations of a software product in a manner that allows the distributor to enforce terms of a licensing agreement for the software product.

SUMMARY

One embodiment of the present invention provides a system that uses digital certificates to facilitate enforcing licensing terms for applications that manipulate documents. During operation, the system (which for example can be located at a server) obtains a credential, wherein the credential includes a private key and a digital certificate containing a corresponding public key. This digital certificate also contains a profile specifying allowed operations which can be performed on documents signed with the credential. Next, the system digitally signs a document using the credential, so that the resulting signed document is signed with the private key and includes a copy of the digital certificate with the profile specifying the allowed operations. The certificate issuer can subsequently revoke the digital certificate (which effectively revokes the license) if terms of a license agreement associated with the digital certificate are violated.

In a variation on this embodiment, another application (which for example can be located at a client) receives the signed document. Upon receiving the signed document, the other application validates the digital signature on the signed document. If the digital signature is valid, the other application examines the profile contained in the digital certificate to determine which operations are allowed on the document, and enables the allowed operations to be performed on the document (and disables other operations). On the other hand, if the digital signature is not valid, the other application is disabled from performing operations on the document.

In a further variation, validating the digital signature involves ensuring that the digital certificate is not expired or revoked.

In a variation on this embodiment, the a credential issuer can revoke the digital certificate if terms of a license associated with the digital certificate are violated, wherein revoking the digital certificate causes operations to be disabled for all documents signed with the digital certificate. This can involve disabling all operations on all documents ever created by the system, disabling documents created after a particular date, or suspending operations for all of the documents temporarily. Furthermore, when the certificate is revoked, the system (at the server) may also stop functioning.

Note that this capability to disable all operations on all documents ever created by the system is a completely new capability, which no existing system can provide. Furthermore, this capability can be used to facilitate enforcement of licensing terms, because the digital certificate can be revoked if terms of a license agreement for the system are violated.

In a variation on this embodiment, prior to signing the document with the credential, the system: configures a user interface (UI) based upon the allowed operations specified in profile; and allows an administrator to select a subset of the allowed operations through the UI. In this variation, digitally signing the document involves incorporating information which identifies the selected subset into the document. In this way, different system configurations (SKUs) associated with different allowed operations can be effectively created without having to create customized code for each different configuration.

In a variation on this embodiment, obtaining the credential involves obtaining the credential from a credential issuer. This credential issuer generates the credential by: generating the private key and the corresponding public key; generating the profile so that the profile specifies allowed operations which are consistent with terms of a licensing agreement; generating the digital certificate containing the profile; and signing the digital certificate with the private key.

In a variation on this embodiment, the allowed operations on the document can include: saving the document; modifying the document; adding comments to the document; digitally signing the document; and submitting the document as a form.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

System

Figure 1:
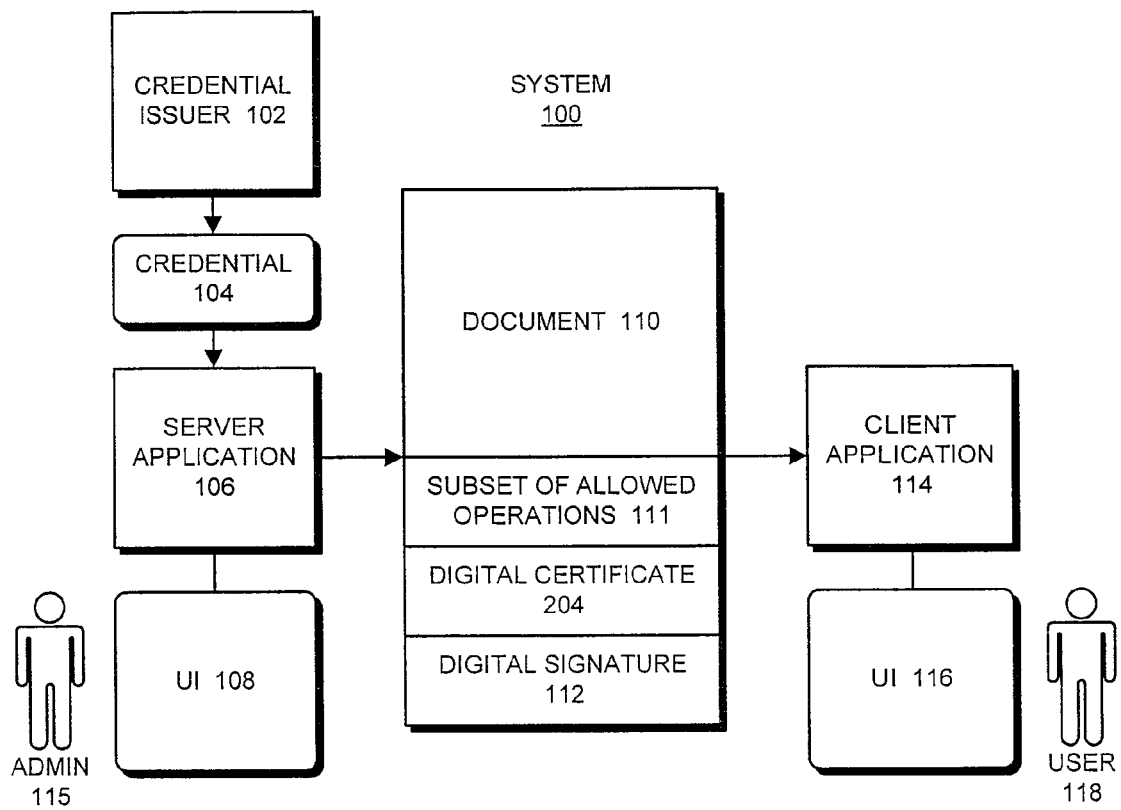
FIG. 1 illustrates a system that uses a digital certificate to facilitate enforcement of licensing terms in accordance with an embodiment of the present invention.

FIG. 1 illustrates a system 100 that uses digital certificates to facilitate enforcement of licensing terms in accordance with an embodiment of the present invention.

Figure 2:
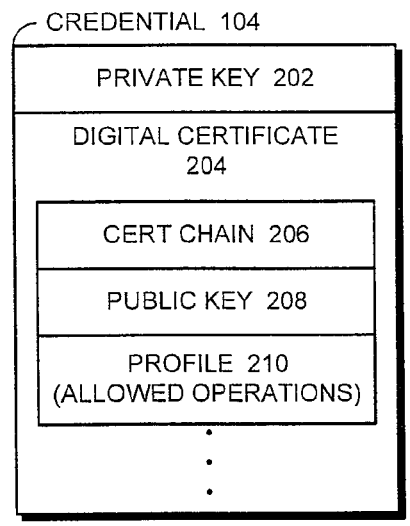
FIG. 2 illustrates the structure of a credential in accordance with an embodiment of the present invention.

This system includes a credential issuer 102, which issues a credential 104 (such as an X.509 credential) to a server. As illustrated in FIG. 2, this credential includes a private key 202 and a digital certificate 204. Like a conventional digital certificate (such as an X.509 certificate), digital certificate 204 includes a certificate chain 206 and a public key 208. In addition to these standard components, digital certificate 204 includes a profile 210, which specifies operations that are allowed to be performed on a document signed with this digital certificate.

Referring back to FIG. 1, credential 104 is communicated to a server application 106, which displays the allowed operations specified in the profile to an administrator 115. Server application 106 then allows the administrator 115 to select a subset of the allowed operations to be enabled for a document 110.

Note that the term "document" as used in this specification and the appended claims generally refers to any digital output from an application. For example, a document can include: a textual document, a digital image, a digital sound file, a digital video clip or computer software. For example, if the application is a compiler, the document can include an executable file, or if the application is an image editing system, the document can include a digital image.

Server application 106 then digitally signs document 110. During this signing process, the system attaches information identifying the subset of allowed operations 111 and a copy of digital certificate 204 to document 110, and then digitally signs the document (and attached information) using private key 202 to produce digital signature 112.

When a client application 114, such as a document editor, receives document 110, client application 114 validates the digital signature on the signed document. If the digital signature is valid, client application 114 examines the profile 210 contained in the digital certificate 204 (as well as the information identifying the selected subset of allowed operations 111) to determine which operations are allowed on the document.

Next, client application 114 enables the allowed operations to be performed on document 110 (and disables other operations). This enables user 118 to perform operation on document 110 through UI 116. On the other hand, if the digital signature is not valid, the user 118 is disabled from performing operations on document 110.

Note that the allowed applications can generally include any type of operation that can be performed on a document. For example, the allowed operations can include: saving the document; modifying the document; adding comments to the document; digitally signing the document; and submitting the document as a form.

Also note that client application 114 and server application 106 can reside on any type of computing device, such as computing device a based on a microprocessor, a mainframe computer, a digital signal processor, a portable computing device, a personal organizer, a device controller, an embedded system and a computational engine within an appliance.

Credential Generation

Figure 3:
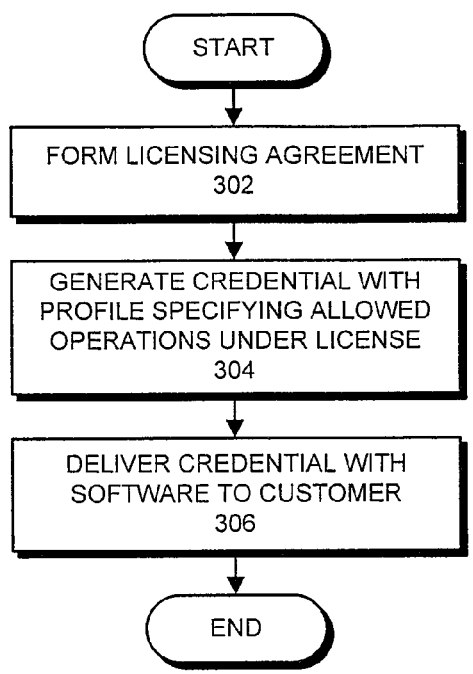
FIG. 3 presents a flow chart illustrating how a credential is generated in accordance with an embodiment of the present invention.

FIG. 3 presents a flow chart illustrating how a credential (such as a credential defined under the X.509 standard) is generated in accordance with an embodiment of the present invention. At the start of this process, two parties (a software distributor and a customer) form a licensing agreement for some software (step 302). Next, a credential issuer 102 associated with the software distributor generates a credential 104 which contains a digital certificate with a profile 210 specifying operations that are allowed under the licensing agreement (step 304). Credential issuer 102 then delivers this credential 104 along with associated software to the customer (step 306). Note that the credential issuer 102 can alternatively be a third party (or intermediary) who does not actually generate the credential, but instead obtains the credential from a credential generator and then delivers the credential to a customer.

Operation Selection by Administrator

Figure 4:
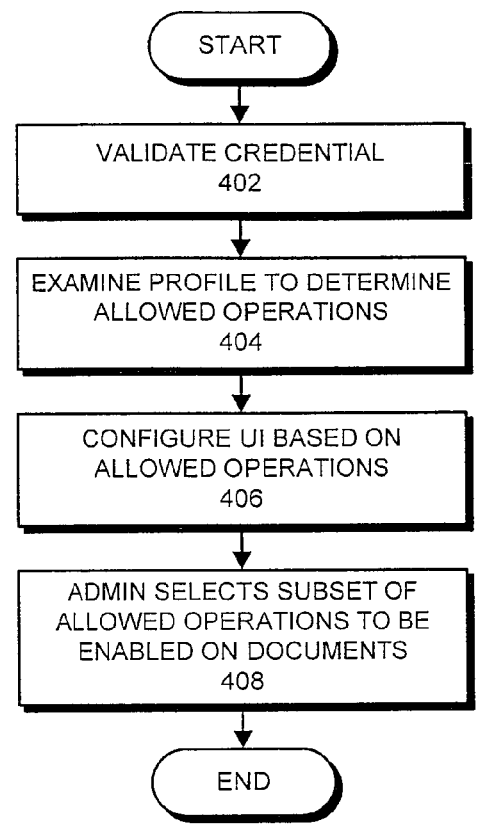
FIG. 4 presents a flow chart illustrating how a subset of the allowed operations is selected by an administrator in accordance with an embodiment of the present invention.

FIG. 4 presents a flow chart illustrating how a subset of the allowed operations is selected by an administrator in accordance with an embodiment of the present invention. First, a server application validates the credential (step 402). This typically involves ensuring that the digital signature and the certificate chain are valid, and that the credential has not expired or has not been revoked. Note that testing for revocation can involve looking up the credential in a certificate revocation list (CRL). Note that this type of lookup is in a CRL well-known for digital certificates.

Also note that the server application can possibly be newly installed software received from the software distributor. Hence, by controlling the allowed operations in the certificate, the software distributor can effectively control the capabilities of the server application without having to generate a customized software configuration for each different set of server application capabilities.

Next, the server application examines the profile within the credential to determine which operations are allowed on documents under the licensing agreement (step 404). The server application then configures a UI based on the allowed operations (step 406). This enables the administrator to select a subset of the allowed operation to be enabled in documents signed by the server application (step 408).

Digital Signing Process

Figure 5:
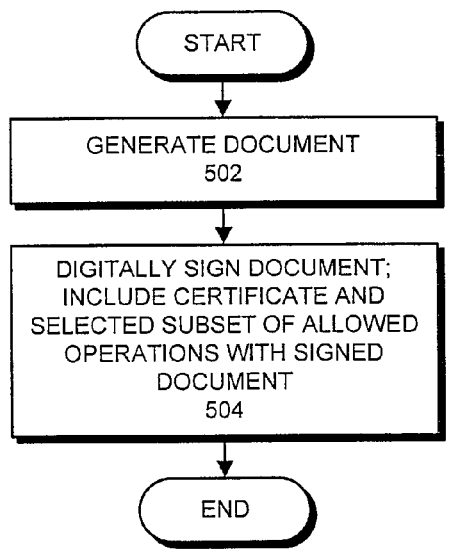
FIG. 5 presents a flow chart illustrating how a document is digitally signed in accordance with an embodiment of the present invention.

FIG. 5 presents a flow chart illustrating how a document is digitally signed in accordance with an embodiment of the present invention. First the server application generates (or otherwise obtains) the document (step 502). Next, the server application includes the digital certificate (with the profile) and the information identifying the selected subset with the document and then signs the document (step 504).

Enabling Operations on a Document

Figure 6:
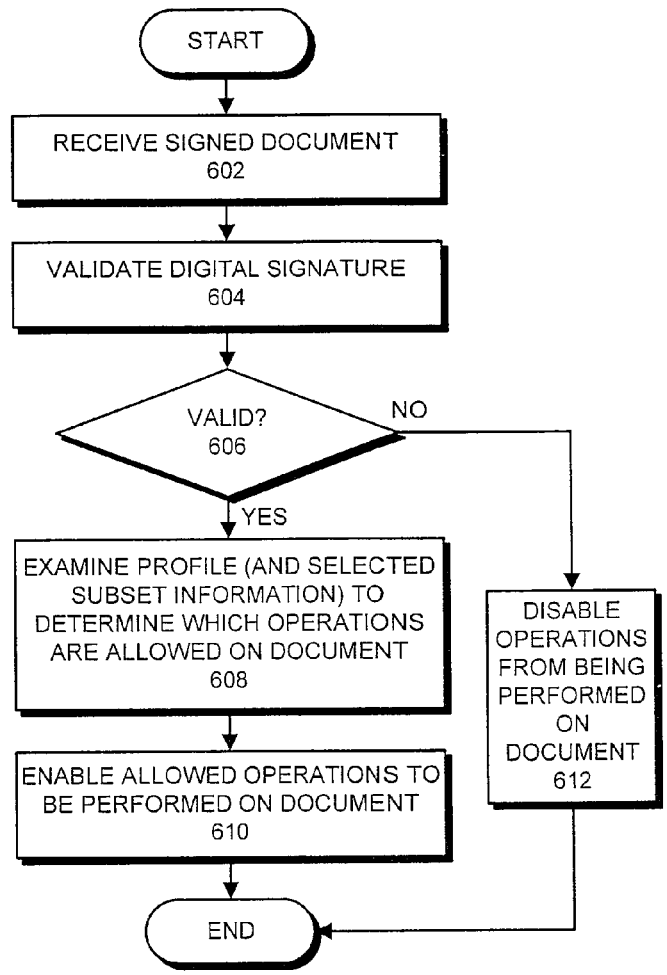
FIG. 6 presents a flow chart illustrating how operations on a document are enabled in accordance with an embodiment of the present invention.

FIG. 6 presents a flow chart illustrating how operations on a document are enabled in accordance with an embodiment of the present invention. First, a client application receives the signed document (step 602). Next, the client application attempts to validate the digital signature to ensure the digital signature has not expired or been revoked (step 604). If the digital signature is not successfully validated, the client application disables operations from being performed on the document (step 612).

In this way, if the credential issuer revokes the certificate, this revocation can: disable all operations on all documents ever created by the system, disable documents created after a particular date, or suspend operations for all of the documents temporarily. Furthermore, when the certificate is revoked, the server application may also stop functioning.

Otherwise, if at step 604, the digital signature is successfully validated, the client application examines the profile (and selected subset information) to determine which operations are allowed on the document (step 608). The client application then enables the allowed operations on the document (step 610).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
    performing by a computer:
        obtaining a credential including:
            a private key; and
            a digital certificate containing a corresponding public key;
        obtaining a document;
        including a copy of the digital certificate with the document;
        digitally signing the document that includes the copy of the digital certificate using the private key of the obtained credential, such that the digitally signed document includes the copy of the digital certificate; and
        sending the digitally signed document including the copy of the digital certificate to a client application.

2. The method of claim 1, further comprising causing the digital signature of the signed document to be validated at the client application.

3. The method of claim 2, wherein validation of the digital signature comprises determining whether the digital certificate is expired or revoked.

4. The method of claim 1, further comprising:
    revoking the digital certificate responsive to receiving an input from an issuer of the credential; and
    responsive to the revoking, causing the digital certificate to fail.

5. The method of claim 1, wherein said obtaining the credential comprises obtaining the credential from a credential issuer; and wherein the credential issuer generates the credential by:
    generating the private key and the corresponding public key;
    generating the digital certificate; and
    signing the digital certificate using the private key.

6. The method of claim 1, wherein the credential further includes a profile specifying allowed operations performable in association with one or more documents signed with the private key of the credential.

7. The method of claim 6, further comprising causing the digital signature of the signed document to be validated;
    if the digital signature is valid,
        examining the profile to determine which operations are allowed to be performed in association with the document, and
        enabling the allowed operations to be performed in association with the document, and
        disabling other operations that are not allowed to be performed in association with the document; and
    if the digital signature is not valid, disabling operations from being performed in association with the document.

8. The method of claim 1, further comprising controlling operations allowable by the document via the certificate such that capabilities of the client application are controlled without generating a unique configuration for each set of different client application capabilities.

9. A computer-readable storage device storing instructions that, responsive to execution by a computer, cause the computer to perform acts comprising:
    obtaining a credential including:
        a private key; and
        a digital certificate containing a corresponding public key;
    obtaining a document;
    including a copy of the digital certificate with the document;
    digitally signing the document that includes the copy of the digital certificate using the private key of the obtained credential, such that the digitally signed document includes the copy of the digital certificate; and
    sending the digitally signed document including the copy of the digital certificate to a client application.

10. The computer-readable storage device of claim 9, the acts further comprising causing the digital signature of the signed document to be validated at the client application.

11. The computer-readable storage device of claim 9, wherein said obtaining the credential comprises receiving the credential from a credential issuer that generated the private key, the corresponding public key, and the digital certificate, the credential issuer using the private key to sign the digital certificate.

12. The computer-readable storage device of claim 9, wherein the credential further includes a profile specifying allowed operations performable in association with one or more documents signed with the private key of the credential.

13. The computer-readable storage device of claim 12, the acts further comprising causing the client application to disable one or more operations associated with the document based on the profile, and causing the client application to disable at least one operation associated with the document if the digital signature of the document is not valid.

14. A computer comprising a storage device storing instructions executable on the computer to perform acts comprising:
    obtaining a credential including:
        a private key; and
        a digital certificate containing a corresponding public key;

obtaining a document;

including a copy of the digital certificate with the document;

digitally signing the document that includes the copy of the digital certificate using the private key of the obtained credential, such that the digitally signed document includes the copy of the digital certificate; and sending the digitally signed document including the copy of the digital certificate to a client application.

15. The computer of claim 14, the acts further comprising causing the digital signature of the signed document to be validated at the client application.

16. The computer of claim 14, the acts further comprising receiving an indication that the digital signature of the signed document is expired or revoked by an issuer of the credential.

17. The computer of claim 14, wherein said obtaining the credential comprises receiving the credential from a credential issuer that generated the private key, the corresponding public key, and the digital certificate, the credential issuer using the private key to sign the digital certificate.

18. The computer of claim 14, wherein the credential further includes a profile specifying allowed operations performable in association with one or more documents signed with the private key of the credential.

19. The computer of claim 18, the acts further comprising causing the client application receiving the document to disable one or more operations associated with the document based on the profile of the credential.

20. The computer of claim 14, wherein the credential further includes a certificate chain.

* * * * *

UNITED STATES PATENT AND TRADEMARK OFFICE
CERTIFICATE OF CORRECTION

PATENT NO. : 8,688,997 B2  Page 1 of 1
APPLICATION NO. : 13/229463
DATED : April 1, 2014
INVENTOR(S) : Das et al.

It is certified that error appears in the above-identified patent and that said Letters Patent is hereby corrected as shown below:

On the title page item [57], after "revokes the license) if" delete "teens", insert -- terms --, therefor.

Signed and Sealed this
Twenty-second Day of July, 2014

Michelle K. Lee
*Deputy Director of the United States Patent and Trademark Office*